United States Patent [19]
Torii et al.

[11] Patent Number: 5,208,054
[45] Date of Patent: May 4, 1993

[54] PROCESS FOR PRODUCTION OF ALCOHOLIC BEVERAGES

[75] Inventors: Kazuyuki Torii, Nishinomiya; Kenji Sato, Nara, both of Japan

[73] Assignee: Suntory Limited, Osaka, Japan

[21] Appl. No.: 704,394

[22] Filed: May 23, 1991

[30] Foreign Application Priority Data

May 23, 1990 [JP] Japan .................. 2-131147

[51] Int. Cl.$^5$ ............................. C12G 3/02
[52] U.S. Cl. ........................ 426/13; 426/592
[58] Field of Search ............. 426/11, 12, 13, 592

[56] References Cited

FOREIGN PATENT DOCUMENTS

| A0219269 | 1/1986 | European Pat. Off. . | |
|---|---|---|---|
| 45-20560 | 7/1970 | Japan . | |
| 48-27478 | 8/1973 | Japan . | |
| 49-61395 | 6/1974 | Japan . | |
| 53-121999 | 10/1978 | Japan . | |
| 57-189638 | 11/1982 | Japan . | |
| 61-254175 | 11/1986 | Japan | 426/11 |
| 62-055069 | 3/1987 | Japan . | |
| 63-91073 | 4/1988 | Japan | 426/11 |
| 63-188379 | 8/1988 | Japan | 426/11 |
| 1-257465 | 10/1989 | Japan | 426/11 |

OTHER PUBLICATIONS

P. A. Albini et al., J. Inst. Brew, vol. 93, pp. 97-104, 1987.
D. J. Baisted, Phytochemistry, vol. 20 No. 5, pp. 985-988, 1981.
Y. Ishikawa et al., Agricultural Chemistry, vol. 48, No. 6, pp. 337-341, 1974.
Yoshizawa et al., Agricultural Chemistry, vol. 47, No. 11, pp. 713-717, 1973.
Yoshizawa, Agricultural Chemistry, vol. 50, No. 3, pp. 115-119, 1976.
Yoshizawa et al., Fermentation Engineering vol. 63, No. 2, pp. 161-173, 1985.
K. Takano, Nippon Shokuhin Kogyo Gakkaishi, vol. 36, No. 6, pp. 519-524, 1989.

*Primary Examiner*—Carolyn Paden
*Attorney, Agent, or Firm*—Burns, Doane, Swecker & Mathis

[57] ABSTRACT

A process for production of an alcoholic beverage which is obtained by alcoholic fermentation by yeast, characterized with employing phospholipase which acts on fermentable materials prior to fermentation, to improve the flavor of the alcoholic beverage.

7 Claims, No Drawings

PROCESS FOR PRODUCTION OF ALCOHOLIC BEVERAGES

BACKGROUND OF THE INVENTION

1. Field of the Invention

The present invention is relates to a process for production of an alcoholic beverage which is obtained by alcoholic fermentation with yeast, and in particular, with improving the flavor of an alcoholic beverage by employing phospholipase in a process for production of alcoholic beverage.

2. Related Art

There is a process for the production of an alcoholic beverage employing a starchy material there have which is saccharified and then subject solid-liquid separation to prepare a fermentable liquid. The fermentable liquid is fermented with yeast as in the case of manufacturing whisky or beer. In of starchy material process, a and is saccharified subject to fermentation with other yeast carried out with mold rice "koji" or enzyme and yeast, as in the case of manufacturing Japanese "sake" or Japanese distilled spirit "shochu".

In other processes for production of alcoholic beverages, starting material contain sugar. In these process, starting materials prepared are for fermentable liquid ànd the liquid is fermented with yeast as in the case of manufacturing wine or cider. In any of these processes, the flavor of alcoholic beverages results mostly from the ester formation by yeast during the fermentation. However, rice and other starting materials for alcoholic beverases, especially barley, wheat, rye, corn, etc. contain a relatively large amount of lipids, and it is known that unsaturated fatty acids in these lipids inhibit ester formation by yeast.

Accordingly, various methods for the removal of unsaturated fatty acids have been proposed as the means of improving the flavor of alcoholic beverages. There is employed, e.g., a method for filtering mash. According to this method, though the amount of unsaturated fatty acids can be reduced to some degrees, it is impossible to reduce the amount of unsaturated fatty acids to such a degree as the increase of flavor component may be expected. In the manufacture of Japanese "sake" or Japanese distilled spirit "shochu", the amount of unsaturated fatty acids can be reduced by steaming the raw material. According to this method, although the unsaturated fatty acids in the outer layers of cereal grains are removed, those in the inner parts of the grains cannot be removed and the complex lipids consisting mainly of fatty acids are reduced in quantity only by 10 and several percentages. In the manufacture of Japanese "sake" or Japanese distilled spirit "shochu", a method wherein the polishing rate of raw material is increased has also been used, but it is not necessarily an economic method and even if polishing rate of raw material is increased, the unsaturated fatty acids in the inner parts of cereal grains cannot be removed, and the method is not very efficient when a raw material containing a relatively large amount of lipids is used.

In Japanese Unexamined Patent Publication No. 58-35674, a process is described for the manufacture Japanese "sake" rich in flavor, in which the starting material, rice, is steeped in water and lipase is added to free fatty acids. The steeped rice is steamed to remove the free fatty acids, especially unsaturated fatty acids.

In Japanese Unexamined Patent Publication No. 62-111695 (European Patent Publication No. 0219269), a process for the manufacture of starch syrups employing phospholipase. The purpose of this process is the improvement of filterability, lowering of foam-formation, clarity of filtrate, etc. There is no suggestion at all as to whether or not that technique may be utilized for the manufacture of alcoholic beverages.

In Japanese Examined Patent Publication No. 59-21594, is described a process for the manufacture of Japanese distilled spirit "shochu" by employing a plurality of enzyme preparations including amylase, protease, and cellulose. The purpose of this process is the simplification of process and the improvement of "shochu".

In Japanese Unexamined Patent Publication No. 62-55069, a process is described for the manufacture of alcoholic beverages obtained by alcoholic fermentation by yeast in which corn grits are treated with amylase, protease and lipase.

However, no process for the manufacture of alcoholic beverages by the employing of phospholipase has been known.

SUMMARY OF THE INVENTION

Accordingly, the present invention relates to an improvement in the manufacture of an alcoholic beverage. The process of the present invention employs phospholipase in order to reduce the amount of unsaturated fatty acids during fermentation.

More particularly, the present invention relates to a process for production of an alcoholic beverage is obtained by alcoholic fermentation with yeast, characterized by employing phospholipase which acts on the fermentable material prior to fermentation.

Rice, barley, wheat, rye, corn and the like as starting materials of alcoholic beverages contain unsaturated fatty acids in a free form or in the form of a glyceride, and unsaturated fatty acids inhibit the synthesis of esters with yeast during fermentation. Lipase frees the unsaturated fatty acids from glyceride when lipase is present during saccharification or fermentation. On the other hand, such starting material as mentioned above contains phospholipids such as lecithin, lysolecithin etc., and these phospholipids, which are usually incorporated in the structure of starch, are freed with the progress of the saccharification and function as a natural surface active agent due to its amphipathic substance.

The present inventors have examined minutely the behaviors of unsaturated fatty acids and phospholipids during saccharification and fermentation in the manufacture of alcoholic beverages and found the following facts. The above phospholipids facilitate the dispersion of the unsaturated fatty acids into the liquid fraction and thereby facilitate the action of unsaturated fatty acids on yeast, but when phospholipase is added, the phospholipase react with phospholipids and the liberated unsaturated fatty acids are adsorbed to the solid fraction in fermentable material, whereby they are converted to a form which is difficult to act on yeast. The formation of flavor esters with by yeast is thereby promoted.

Further solid-liquid separation is conducted after saccharification, the unsaturated fatty acids are removed together with the solid fraction, so that it is the process of the present invention is more efficient.

The present invention may be applied to the manufacture of various kinds of alcoholic beverages such as Japanese "sake", beer, whisky, Japanese distilled spirit "shochu", spirits, wine, brandy, cider etc., and it may be applied to various kinds of starting materials such as rice, barley, wheat, rye, corn, maize, oat, potato, sweet potato, grape, apple, sugar cane and the like.

The present invention is effective especially for the starting materials which contain a large amount of unsaturated fatty acid, such as barley, wheat, rye, corn, etc.

In the present invention, it is not necessary to make modifications to the conventional manufacturing processes for various kinds of alcoholic beverages, and it suffices if phospholipase is added at an appropriate stage of the conventional process. The solid-liquid separation, which is more efficient for this invention, prior to fermentation is carried out in most conventional manufacturing process for production of alcoholic beverages.

In the manufacture of, e.g., beer, malt is produced from barley and milled, and warm water and optional cereal adjucts are added to the thus milled malt to saccharify it. Then the mash is filtered and hops are added to the filtered wort and the wort is boiled, whereupon the fermentation of the wort is carried out after the wort has been cooled. On the other hand, in the manufacture of grain whisky, corns are cooked with water, and ground malt is as added an enzyme-providing agent to the thus cooked corns to saccharify. Fermentation of the mash with yeast is carried out without filtration prior to fermentation. The former process is the representative example of the cases where fermentation is carried out after filtration which remove the solid fraction from saccharified material, and the latter is the representative example of the cases where fermentation is carried out without removing solids from saccharified mash. The foregoing are the outlines of the examples of manufacturing processes of alcoholic beverages, to which the present invention can be applied, and further to the manufactures of Japanese "sake", Japanese distilled spirit "shochu", spirits, fruit wines, brandies, cider, etc., the present invention can be applied without making any modifications in each of the widely known processes.

Phospholipase can be added before the commencement of saccharification, e.g., together with a saccharifying enzyme-providing agent. It can also be added into fermentable material after the commencement of saccharification. As phospholipase retains its activity even at a relatively higher temperature and functions within a relatively wide pH range and temperature range, the pH value and temperature of fermentable material do not need to be adjusted for the function of phospholipase, and usual alcoholic beverage-manufacturing conditions are sufficient for this purpose. Phospholipase can also be added after the completion of saccharification and act for a desired time. Phospholipase can be added to fermentable material prior to fermentation and acts for desired time, in the process for production of alcoholic beverages employing sugar in starting material e.g., fruit juice.

At whichever point of time of the above stages phospholipase may be added, the time during which phospholipase acts, is the one required for the phospholipids in the fermentable material to decompose sufficiently, though such time varies depending upon the conditions such as the amounts of employed phospholipase, contents of the phospholipids, pH value, temperature etc., it is usually 2 hours at a temperature of 60° C. If phospholipase is added before the commencement of saccharification, it functions well during the saccharification, so that this method is convenient.

In fermentable material, there are unsaturated fatty acids dispersed. The unsaturated fatty acids are adsorbed to the solid fraction in the fermentable material and insolubilized by the action of phospholipase, so it difficult for these to act on yeast. Further the fermentable material is applied to solid-liquid separation by the conventional means such as filtration and centrifugal separation so that the unsaturated fatty acids adsorbed to the solid fraction are removed. The formation of esters with yeast is greatly inhibited by the presence of unsaturated fatty acids in a concentration of 100 ppm or more, and when the concentration of unsaturated fatty acids is below 100 ppm, the amounts of the formating esters are increased with the decrease of the amounts of the unsaturated fatty acids. It is desirable that the amount of the unsaturated fatty acids is below 50 ppm. By the above action of the phospholipase on unsaturated fatty acids, the concentration of unsaturated fatty acids in the liquid fraction can be reduced below 50 ppm. Furthermore, a fermentable material, the concentration of unsaturated fatty acids of which has reduced below 50 ppm, can be obtained by subjecting the fermentable material to solid-liquid separation. In the concurrence of saccharification and fermentation for manufacturing alcoholic beverages, e.g., the manufacturing process of Japanese "sake", steamed rice, mold rice "koji", yeast and water are mixed and the thus obtained mixture is carried out to saccharification and fermentation at the same time. In this case, phospholipase may be added at the commencement of saccharification fermentation (the first addition of material), or after that time, e.g., at the time of second addition of the material.

Though the amount of phospholipase to be added depends upon the amounts of phospholipids in the fermentable material, the amounts of unsaturated fatty acids, the starting material employed, the temperature while phospholipase acts, the pH value, the time etc., it is, e.g., 2.5 to 26 U/l mash in case of manufacturing grain whisky. 2.5 to 25 U/l wort in case of manufacturing beer. 25 to 50 U/l mash in case of manufacturing Japanese "sake", 10 to 25 U/l mash in case of manufacturing Japanese distilled spirit "shochu", etc. In the present invention, the activity of phospholipase is defined as the amount of enzyme capable of decomposing yolk lysophosphatidyl choline (L P C) at a rate of 1 micromole/min at pH value of 5.5 and at a temperature of 40° C. be 1 unit (U).

In the present invention, though an any phospholipase may be employed, phospholipase B is particularly desirable. As phospholipase, there may be suitably employed the ones produced by microorganisms such as Asperpillus, Rhizopus, Penicillium, Candida, Corticium, Bacillus etc. Though it is preferable to employ purified enzyme as the enzyme preparation, crude enzyme may also be employed so far as the quality of alcoholic beverage is acceptable. Various kinds of phospholipase products are commercially available and these may be employed in the manufacture of alcoholic beverages, and even products commercially available as "lipase preparation" may be employed if such products contain phospholipase. Furthermore, cultures of microorganisms, e.g., phospholipase-containing products called "solid koji" may also be employed.

In the following, the present invention is explained more concretely with reference to Examples.

EXAMPLE 1

5.7 kg of barley was milled and 26.4 l of water was added to the thus milled barley, whereupon the obtained mixture was cooked for 30 min at a temperature of 120° C. Amylase in an amount of 2300 U/l and phospholipases B in amount of 20 U/l were added to the prepared barley-cooked mash, and the resulting mixture was saccharified at a pH of 5.5 at a temperature of 60° C. and filtrated with filter paper, whereupon the amounts of unsaturated fatty acids in the filtrate were measured. The addition of phospholipase B was conducted at the commencement of the saccharification or 2 hours after the commencement of saccharification, and the actioning times after the addition of phospholipase B were selected within the range from 0 to 4 hours. As control, an experiment was carried out following the procedure set forth above wherein no phospholipase was added. The result is set forth in the following Table 1.

TABLE 1

| Phospholipase added | Time after the addition of phospholipase (hr) | Concentration of unsaturated fatty acid (C 18'') (ppm) |
|---|---|---|
| At the commencement of saccharification | 0 | 2.4 |
| | 1 | 9.7 |
| | 2 | 5.7 |
| | 4 | 2.5 |
| 2 hours after the commencement of saccharification | 0 | 67.6 |
| | 1 | 30.1 |
| | 2 | 30.3 |
| Phospholipase not added (4 hours after the commencement of saccharification) | | 120 |

EXAMPLE 2

A. 5.7 kg of barley was milled and 26.4 l of water was added thereto, following which the obtained dispersion was cooked for 30 min at a temperature of 120° C., and after the thus cooked mash was cooled to a temperature of 60° C. 70000 U of glucoamilase and 600 U of phospholipase were added thereto and the mash was saccharified for 120 min at a temperature of 60° C.

Yeast was added to 16 l of filtrate obtained by filtering the saccharified mash with filter paper and the filtrate was fermented at a temperature of 30° C. for 7 days, whereupon it was distilled. As control, the same procedure was conducted without employing phospholipase enzyme. The change of amount of linoleic acid (C 18'') by the procedure and the amount of esters after the distillation was determined by gas chromatography, and the result set forth in Table 2 was obtained. Furthermore, the amount of linoleic acid (C 18'') in the supernatant liquid obtained from fermented mash by centrifugal separation as solid-liquid separation, was determined, and the result set forth in Table 2 was obtained.

TABLE 2

| | Phospholipase Added | Phospholipase not added |
|---|---|---|
| C 18'' after cooking | 2 ppm | 2 ppm |
| C 18'' in the mash after saccharification | 1064 | 872 |
| C 18'' in the filtrate after saccharification | 9 | 93 |
| C 18'' in the centrifuged supernatant liquid after saccharification | 29 | 106 |
| Amounts of esters after distillation | | |
| EtC 2 | 174% (*) | 100% |
| EtC 8 | 136% | 100% |
| EtC 10 | 200% | 100% |
| EtC 12 | 500% | 100% |

(*) % based on the percentage of each ester being set as 100% when phospholipase B was not added (control).

B. The procedure for the saccharification was carried out in the same way as A, and solid-liquid separation was carried out by machine filter in place of filter paper. Subsequently, fermentation and distillation were carried out in the same way as A, whereupon the amount of linoleic acid (C 18'') in distillate was determined. The result obtained is set forth in Table 3.

TABLE 3

| C 18'' in the filtrate after saccharification | 12 ppm |
|---|---|
| Amounts of esters after distillation | |
| EtC 2 | 175% (*) |
| EtC 8 | 175% |
| EtC 10 | 240% |
| EtC 12 | 650% |

The above result may be compared with the result obtained when phospholipase was not added, as set forth in Table 2, as control.

C. Cooking was carried out in the same way as A, and then the cooked mash was cooled to a temperature of 60° C., following which 2.5 kg of mold barley as phospholipase source, 10 l of water and 1000 U of glucoamylase were added to the cooked mash and the thus obtained mixture was saccharified, and then solid-liquid separation, fermentation and distillation were carried out in the same way as A. The result as set forth in the following Table 4 was obtained.

TABLE 4

| C 18'' in the Filtrate after saccharification | 4 ppm |
|---|---|
| Amounts of esters after distillation | |
| EtC 2 | 294% (*) |
| EtC 8 | 300% |
| EtC 10 | 427% |
| EtC 12 | 700% |

The above result, may be compared with the result obtained when phospholipase was not added, as set forth in Table 2, as control.

I claim:

1. A process for the production of an alcoholic beverage comprising the steps of adding phospholipase to fermentable materials, and fermenting the fermentable materials under conditions sufficient to produce an alcoholic beverage.

2. A process for the production of an alcoholic beverage comprising the steps of adding phospholipase to a starch-containing material, saccharifying the starch-containing material to obtain a saccharified product, and fermenting the saccharified product to produce an alcoholic beverage.

3. A process for the production of an alcoholic beverage comprising the steps of saccharifying a starch-containing material wherein, during the saccharification, phospholipase is added to the starch-containing material, and fermenting the saccharified product to produce an alcoholic beverage.

4. A process for the production of an alcoholic beverage comprising the steps of saccharifying a starch-containing material, adding phospholipase to the saccharified product, and fermenting the saccharified product to produce an alcoholic beverage.

5. A process for the production of an alcoholic beverage comprising the steps of adding phospholipase to a starch-containing material, and carrying out a concurrent saccharification-fermentation to produce an alcoholic beverage.

6. A process for the production of an alcoholic beverage comprising the step of carrying out a concurrent saccharification-fermentation of a starch-containing material wherein, during the concurrent saccharification-fermentation, phospholipase is added to the starch-containing material to produce an alcoholic beverage.

7. A process for the production of an alcoholic beverage comprising the steps of adding phospholipase to a sugar-containing material, and fermenting the sugar containing material to produce an alcoholic beverage.

* * * * *